Jan. 25, 1938.          T. A. BYERS          2,106,493
SPEED CONTROL DEVICE
Filed March 17, 1936
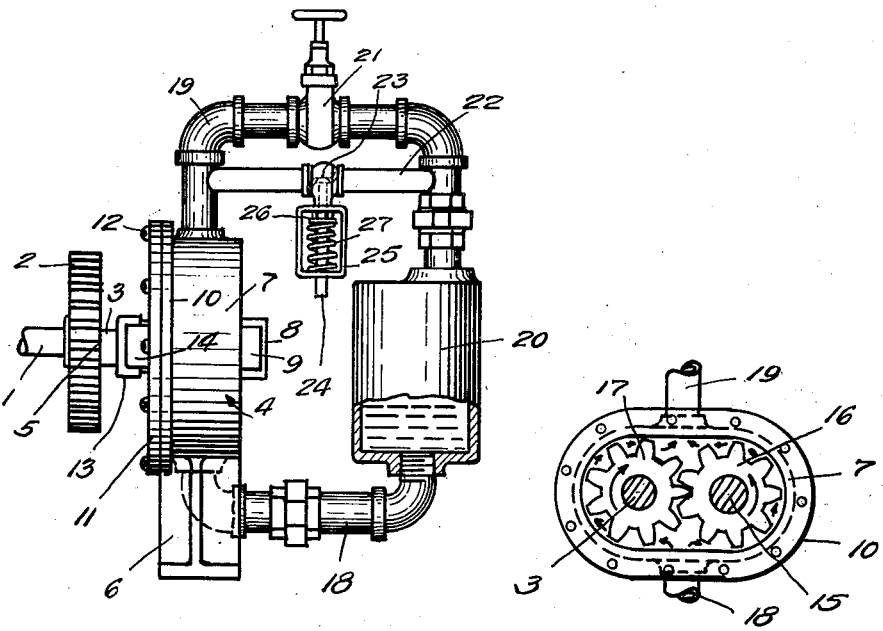
Fig.1                    Fig.2
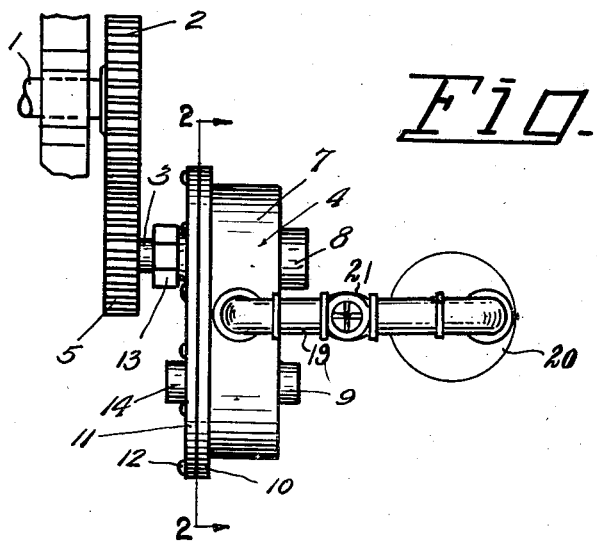
Fig.3
INVENTOR.
Thomas A. Byers
BY
Glenn S. Fish
ATTORNEY.

Patented Jan. 25, 1938

2,106,493

UNITED STATES PATENT OFFICE 2,106,493

SPEED CONTROL DEVICE

Thomas A. Byers, Spokane, Wash.

Application March 17, 1936, Serial No. 69,399

1 Claim. (Cl. 188—92)

This invention relates to a speed control device and one object of the invention is to provide a device of this character consisting of a fluid pump having means associated therewith to regulate ease of operation of the pump, the pump having its shaft geared to a drive shaft so that the speed at which the drive shaft rotates can be regulated by adjustment of the pump controlling means.

Another object of the invention is to provide an improved arrangement of circulating pipes for fluid which passes through the pump, the pipes being provided with valves so located that flow of the fluid may be accurately controlled and ease of operation of the pump thus controlled.

Another object of the invention is to so arrange the pipes that there will be provided a main pipe line and a bridging pipe, together with an improved arrangement of valves in the main pipe line and bridge which, when properly adjusted, will regulate the speed at which the pump operates.

Another object of the invention is to so construct the speed control device that it will be of simple construction and not liable to fail to operate properly.

The invention is illustrated in the accompanying drawing, wherein:

Figure 1 is a view principally in elevation of the improved speed control device.

Figure 2 is a sectional view taken through the pump of the device along the line 2—2 of Figure 3.

Figure 3 is a top plan view of the pump and gearing which connects the pump with a rotary shaft, the speed of which is to be regulated.

This improved speed control device may be applied to any machine which includes, as one of its elements, a rotatably mounted shaft 1 to which a gear 2 is secured so that rotary motion may be transmitted from this shaft to the shaft 3 of a pump 4 by the gear 3 meshing with a cooperating gear 5 carried by the pump shaft. It will thus be seen that when the machine is in operation, motion will be directly transmitted to the pump and the speed at which the pump operates will be controlled by the speed at which the shaft 1 turns.

The pump may be provided with a base 6 to rest upon a suitable support or supported in a horizontal position in any other manner desired and has a casing 7 which is elongated horizontally, as shown in Figure 2, and formed with arcuate end walls merging into its upper and lower walls. The rear wall of the casing carries bearings 8 and 9 and about its open front the casing is provided with an outstanding bordering flange 10 to which marginal portions of a front wall 11 is detachably secured by bolts or screws 12 so that it can be easily detached when access to the interior of the pump casing is necessary. Opposite the bearings 8 and 9 the front wall carries bearings 13 and 14 which cooperate with them to rotatably mount the pump shaft 3 and the stub shafts 15 of a pump gear 16 which meshes with a companion pump gear 17 carried by the shaft 3, and, upon referring to Figure 2, it will be seen that during rotations of the gears or impellers 16 and 17, liquid entering the pump casing through the pipe line 18 will be moved upwardly around the gears and out through the pipe line 19. The pipes 18 and 19 communicate with the lower and upper ends of the tank 20 and, therefore, a circulation of liquid will be created during operation of the pump. It should be noted that the pipe line 18 serves as a support for the tank 20 and the upper pipe line 19 serves to brace the tank and maintain the tank in the upright position shown in Figure 1. A valve 21 intermediate the length of the pipe line 19 controls flow of liquid through this pipe line and, by opening or closing this valve, flow of liquid may be regulated. A bridging pipe 22 extends between arms of the pipe line 19 and intermediate its length carries a check valve 23, the stem 24 of which is slidable through a frame 25 carried by the valve. An abutment 26 is threaded upon the stem and engaged by a helical spring 27 which has its other end bearing against the outer end of the frame 25. Therefore, the stem will be yieldably held against outward movement and the valve will be normally closed but permitted to open when sufficient pressure is exerted by liquid forced through the bridging pipe during operation of the pump.

When this speed control device or apparatus is in operation it is set up in such position that its gear 5 meshes with the gear 2 carried by the shaft 1 of the machine whose speed is to be controlled. The valve 21 may be fully opened and the machine will operate at full speed as the liquid will have free passage through the pipe 19. When it is desired to reduce the speed at which the machine operates, the valve 21 is partially or fully closed and, as its stem and gate move in a closing direction, flow of liquid through the pipe 19 will be retarded and liquid caused to pass through the bridging pipe 22. Passage of the liquid through this bridging pipe is resisted by the check valve 23 but pressure developed by the pump will force the check valve open and the liquid can circulate. The force required to open the check valve exerts drag upon the pump and the shaft 1 to which it is geared and thus reduces the speed of the shaft and the machine of which the shaft 1 forms a part. By adjusting the abutment 26 to regulate tension of the spring 27 the force required to open the check valve may be controlled and the extent to which the device reduces speed of the machine regulated.

Having thus described the invention, what is claimed is:

A speed controlling device comprising a pump having a casing, upper and lower walls of the casing being formed with a lower inlet and an upper outlet, impeller gears rotatably mounted in said casing between the inlet and the outlet and having meshing teeth, one gear having a shaft projecting from a side wall of the casing and adapted to be rotated from a rotary shaft of a machine to be controlled, a reservoir for liquid disposed vertically at the opposite side of the casing from said shaft in spaced relation to the casing, an unobstructed pipe line leading from the bottom of said reservoir and extending under the pump casing and connected with the inlet thereof and serving as a support for the reservoir, an upper pipe line leading upwardly from the outlet of the pump casing and extending over the reservoir and opening into the reservoir through the top thereof, the upper pipe line serving as an upper brace for the reservoir, a manually adjustable valve in the upper pipe line for controlling flow of liquid through the same from the pump to the reservoir, a bridging pipe associated with the upper pipe line and communicating with end portions thereof in spaced relation to the casing and the reservoir and opposite ends of said valve, and a check valve intermediate the length of the bridging pipe yieldably held closed and adapted to open in the direction of the reservoir when subjected to excessive pressure.

THOMAS A. BYERS.